United States Patent
Martin et al.

(10) Patent No.: US 10,759,163 B2
(45) Date of Patent: Sep. 1, 2020

(54) PRINTING DEVICE

(71) Applicant: HEWLETT-PACKARD DEVELOPMENT COMPANY, L.P., Houston, TX (US)

(72) Inventors: Eric T Martin, Corvallis, OR (US); Daryl E Anderson, Corvallis, OR (US); James Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 73 days.

(21) Appl. No.: 15/516,390

(22) PCT Filed: Oct. 27, 2014

(86) PCT No.: PCT/US2014/062411
§ 371 (c)(1),
(2) Date: Apr. 1, 2017

(87) PCT Pub. No.: WO2016/068849
PCT Pub. Date: May 6, 2016

(65) Prior Publication Data
US 2017/0297328 A1    Oct. 19, 2017

(51) Int. Cl.
| | | |
|---|---|---|
| B41J 2/045 | (2006.01) |
| B41J 2/14 | (2006.01) |
| B41J 29/38 | (2006.01) |
| B41J 29/393 | (2006.01) |
| H02J 9/06 | (2006.01) |

(52) U.S. Cl.
CPC ......... *B41J 2/04541* (2013.01); *B41J 2/0455* (2013.01); *B41J 2/0458* (2013.01); *B41J 2/14072* (2013.01); *B41J 29/38* (2013.01); *B41J 29/393* (2013.01); *H02J 9/06* (2013.01)

(58) Field of Classification Search
None
See application file for complete search history.

(56) References Cited

U.S. PATENT DOCUMENTS

| | | | |
|---|---|---|---|
| 4,434,356 A | | 2/1984 | Craig et al. |
| 4,528,459 A | * | 7/1985 | Wiegel ............... H02J 7/34 307/66 |
| 5,408,590 A | * | 4/1995 | Dvorzsak ............ B41J 3/543 101/4 |

(Continued)

FOREIGN PATENT DOCUMENTS

JP    2003291380    10/2003

OTHER PUBLICATIONS

Quick, et al. "Evolutionary Printer Provides Significantly Better Performance"—Author Quick, http://www.hpmuseum.org/journals/hp41/41pr.htm, Mar. 1980.

*Primary Examiner* — Alejandro Valencia
(74) *Attorney, Agent, or Firm* — Trop, Pruner & Hu, P.C.

(57) ABSTRACT

A method of operating a printing device during a power loss event includes, with a power loss protection supply voltage generator coupled to a printhead driving circuit, maintaining a power loss protection supply voltage ($V_{DD}\_plp$) to the printhead driving circuit until a high voltage power supply ($V_{PP}$) to the high voltage devices drops below a threshold voltage.

14 Claims, 9 Drawing Sheets

(56) References Cited

U.S. PATENT DOCUMENTS

| | | | |
|---|---|---|---|
| 5,420,783 A * | 5/1995 | Gross | B41J 2/355 307/64 |
| 5,555,013 A * | 9/1996 | Mori | B41J 2/45 347/237 |
| 6,068,860 A | 5/2000 | Hiwada | |
| 6,183,056 B1 | 2/2001 | Corrigan et al. | |
| 6,322,189 B1 * | 11/2001 | Anderson | B41J 2/04528 347/17 |
| 6,481,814 B2 | 11/2002 | DeMoor et al. | |
| 6,520,615 B1 | 2/2003 | Beck et al. | |
| 7,255,410 B2 | 8/2007 | Masuda | |
| 2003/0132988 A1 | 7/2003 | Beck et al. | |
| 2009/0002457 A1 | 1/2009 | Sakurai | |

* cited by examiner

PRINTING DEVICE

BACKGROUND

Printing devices include circuitry used in ejecting ink from printheads. Application of a current to a printhead of a printing device causes an ink droplet to be ejected by heating a resistive element located within an ink supply in a firing chamber. This resistive heating causes a bubble to form in the ink, and the resultant pressure increase forces an ink droplet from a nozzle fluidly coupled to a firing chamber.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The resistive elements located within the ink supply in a firing chamber may be destroyed or otherwise rendered inoperable if too much current is applied to the resistive elements. Therefore, a loss in control of a number of circuits in the printing device through an unexpected or uncontrolled loss in power to the printing device may destroy the resistive elements used to eject ink from the printheads.

Examples described herein provide circuit topologies that reduce or eliminate the potential for uncontrolled high voltage dissipation within printhead resistive elements and other active devices in a number of high voltage circuits of a printing device that may render the resistors and other active devices inoperable. Application of too much energy in a resistor, including resistors used to eject ink from a printhead, may destroy the resistors. Whether the resistor is made of metal-film, wire, glass, glass-ceramic, or another resistive material, its material may melt due to the application of too high of voltages. The resulting high temperature destroys the resistor material.

When power to a printing device is lost unexpectedly, the printing device loses control of a number of low voltage circuits that supply fire control signals to a number of high voltage circuits. The high voltage circuits such as nozzle firing field-effect transistors (FETs) that control the firing of ink from the nozzles of the printhead are enabled and disabled based on the signals from the low voltage circuits. Loss of control signals from the low voltage circuits to the high voltage circuits results in loss of control of the high voltage circuits, which may result in damage to, or destruction of the resistors and other active devices within the printhead.

The circuit topologies of the present application utilize a power loss protection $V_{DD}$ supply referred to herein as "$V_{DD}$_plp" to prevent damage to firing resistors and other circuitry within the printhead die in the case were a $V_{DD}$ supply voltage drops before a high voltage supply ($V_{PP}$) or its associated logic line ($V_{PP}$_logic) (collectively referred to herein as $V_{PP}$) is at a safe level. $V_{DD}$_plp represents a $V_{DD}$ "power loss protected" supply voltage generated by the circuit topologies of the present application, and is provided to circuits within the printing device and the printhead die to prevent $V_{PP}$ from being switched onto the firing resistors in an uncontrolled state.

As used in the present specification and in the appended claims, the terms "power loss," "uncontrolled power loss," or similar language is meant to be understood broadly as any loss of power to any number of circuitry within a printing device.

Further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1A:
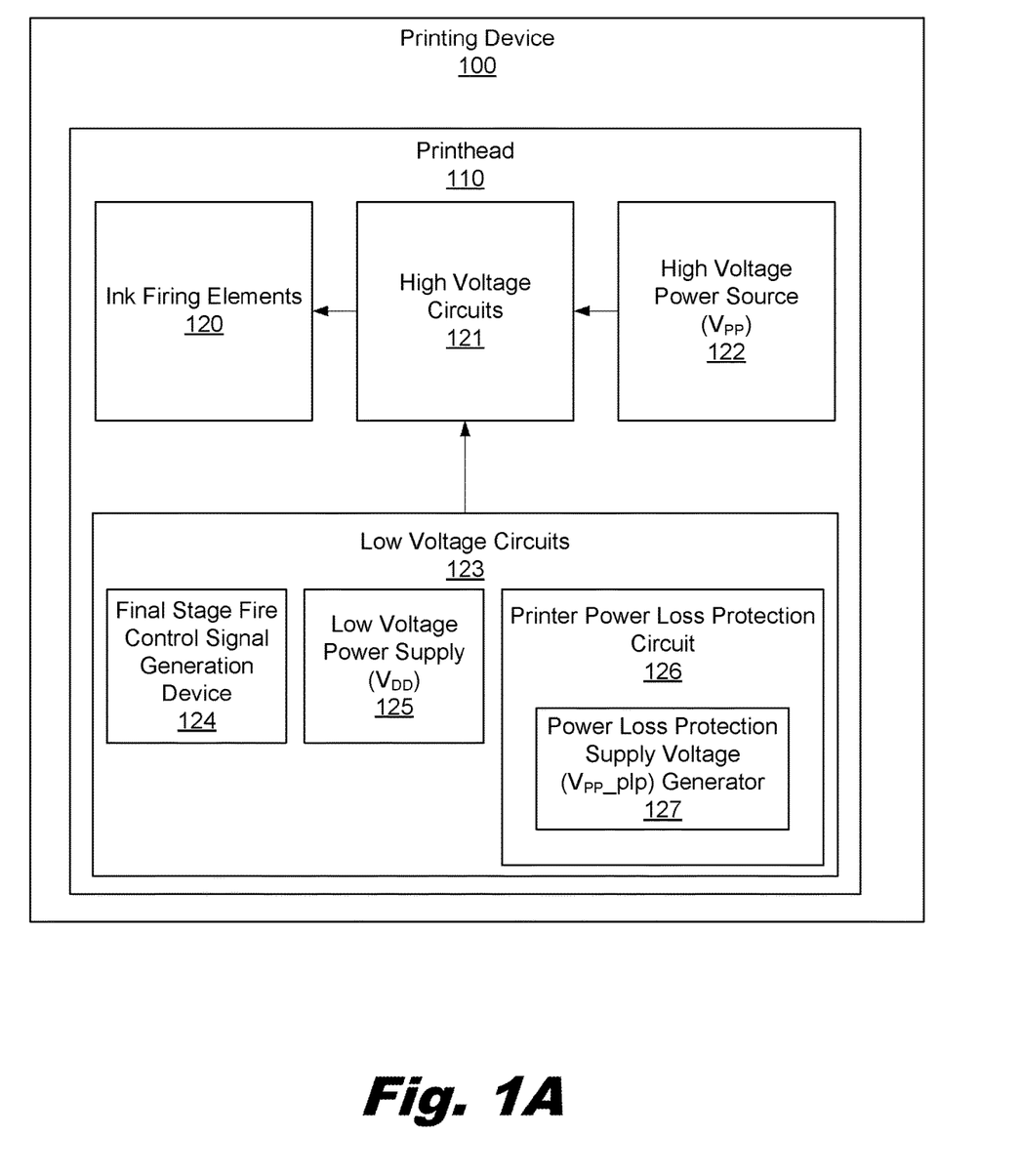
FIG. 1A is a diagram of a printing device incorporating a power loss protection circuit, according to one example of the principles described herein.

Turning now to the figures, FIG. 1A is a diagram of a printing device (100) incorporating a power loss protection circuit, according to one example of the principles described herein. The printing device (100) includes a number of printheads (110). Each printhead (110) includes a number of ink firing elements (120), and a number of high voltage circuits (121) to drive the ink firing elements. A high voltage power source ($V_{PP}$) (122) is included in the printing device (100) to power the high voltage circuits (121) and ink firing elements (120).

The printing device (100) further includes a number of low voltage circuits (123) to provide a number of fire control signals to the high voltage circuits (121). A final stage fire control signal generation device (124) is connected to the low voltage circuits (123). The printing device further includes a low voltage power supply ($V_{DD}$_plp) is connected to the low voltage circuits (123) to provide power to the low voltage circuits.

The printing device (100) further includes a printer power loss protection circuit (126). The printer power loss protection circuit (126) includes a power loss protection supply voltage generator (127) to maintain a power loss protection supply voltage ($V_{DD\_plp}$) to the final stage fire control signal generation device (124) until the high voltage power source ($V_{PP}$) (122) drops below a threshold voltage within the high voltage circuitry (121). $V_{DD\_plp}$ is generated from the high voltage power source ($V_{PP}$) (122). These various elements will now be described in more detail in connection with FIGS. 1B through 9.

Figure 1B:
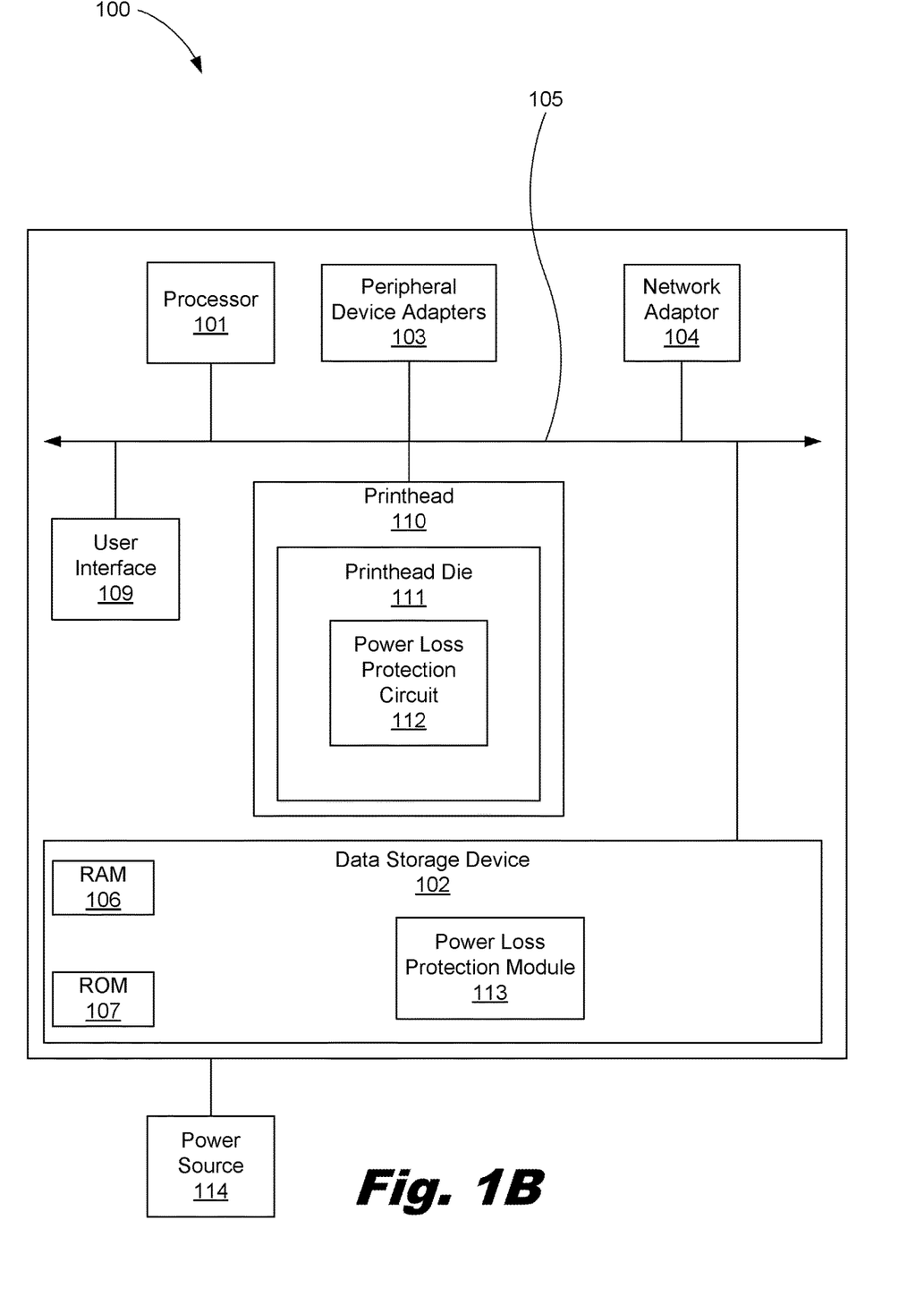
FIG. 1B is a diagram of a printing device incorporating a power loss protection circuit, according to another example of the principles described herein.

FIG. 1B is a diagram of a printing device (100) incorporating a power loss protection circuit (112), according to another example of the principles described herein. The printing device (100) may be implemented in an electronic device. The printing device (100) may be utilized in any data processing scenario including, stand-alone hardware, mobile applications, through a computing network, or combinations thereof. Further, the printing device (100) may be used in a computing network, a public cloud network, a private cloud network, a hybrid cloud network, other forms of networks, or combinations thereof.

In one example, the methods provided by the printing device (100) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the printing device (100) are executed by a local administrator.

To achieve its desired functionality, the printing device (100) includes various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapters (103), and a network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of detecting an uncontrolled power loss to a number of high voltage devices, and with a power loss protection supply voltage generator coupled to a printhead driving circuit, maintaining a power loss protection supply voltage ($V_{DD\_plp}$) to the printhead driving circuit until a high voltage supply ($V_{PP}$) to the high voltage devices drops below a threshold voltage, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106) and Read Only Memory (ROM) (107). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the printing device (100) enable the processor (101) to interface with various other hardware elements, external and internal to the printing device (100). For example, the peripheral device adapters (103) may provide an interface to input/output devices, such as, for example, user interface (109), a mouse, or a keyboard. The peripheral device adapters (103) may also provide access to other external devices such as an external storage device, a number of network devices such as, for example, servers, switches, and routers, client devices, other types of computing devices, and combinations thereof.

The user interface (109) may be provided to allow a user of the printing device (100) to interact with and implement the functionality of the printing device (100). The peripheral device adapters (103) may also create an interface between the processor (101) and the user interface (109), another printing device, or other media output devices. The network adapter (104) may provide an interface to other computing devices within, for example, a network, thereby enabling the transmission of data between the printing device (100) and other devices located within the network.

The printing device (100) may, when executed by the processor (101), display the number of graphical user interfaces (GUIs) on the user interface (109) associated with the executable program code representing the number of applications stored on the data storage device (102). The GUIs may display, for example, a number of user-interactive printing options.

The printing device (100) further includes a number of printheads (110) used to eject ink onto a print medium. The printheads (110) operate based on instructions contained within a print job sent from a computing device. The print job contains instructions to print, for example, a document. The processor (101) interprets the print job, and causes the printheads (110) to eject ink onto the print medium such that the document contained in the print job is represented on the print medium.

Each of the number of printheads (110) includes a printhead die (111). A printhead die (111) may be made from a block of semiconducting material on which the functional circuits described herein are fabricated. In one example, the printhead die (111) is fabricated on a wafer of electronic-grade silicon (EGS) or other semiconductor through processes such as photolithography.

The printing device (100) further includes a power loss protection circuit (112) fabricated into the printhead die (111) of each of the printheads (110). The power loss protection circuit (112) may assist the printing device (100) in controlling a number of circuits in a printhead die (111) through an unexpected or uncontrolled loss in power to the printing device. As described herein, an unexpected or uncontrolled loss in power to the printing device (100) may destroy the resistive elements used to eject ink from the printheads (110) or other elements included within the printhead dice (111) of the printheads (110).

Figure 2:
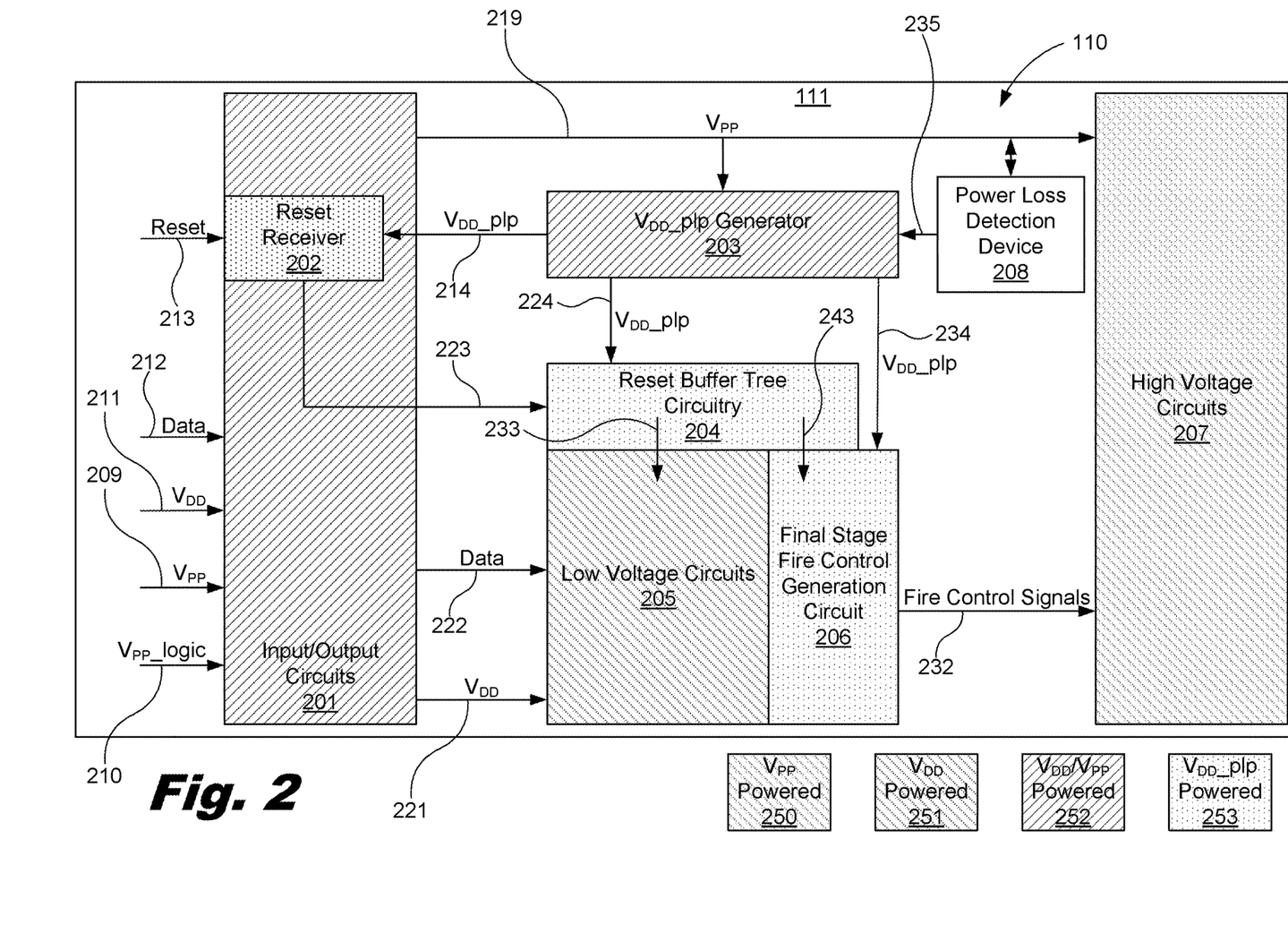
FIG. 2 is a diagram of an on-die $V_{DD}$_plp generator of the power loss protection circuit of FIGS. 1A and 1B, according to one example of the principles described herein.

The power loss protection circuit (112), in one example, may include a power loss protection, low voltage power ($V_{DD}$_plp) generator (FIG. 2, 208). In one example, the $V_{DD}$_plp generator (FIG. 2, 208) may continuously provide $V_{DD}$_plp to a number of low voltage circuits that control the firing of a number of high voltage circuits before, during, and after a power loss event occurs. In this example, the $V_{DD}$_plp generator (FIG. 2, 208) may continually provide $V_{DD}$_plp to the low voltage circuits. When an uncontrolled power loss event occurs, the $V_{DD}$_plp generator (FIG. 2, 208) generates and maintains $V_{DD}$_plp to the low voltage circuits until a high voltage power supply ($V_{PP}$) applied to the high voltage circuits or its associated logic line ($V_{PP}$_logic) drops below a threshold.

In another example, the $V_{DD}$_plp generator (FIG. 2, 208) may be instructed by a power loss detection device (FIG. 2, 208) to provide $V_{DD}$_plp to the low voltage circuits when an uncontrolled power loss event occurs, while the $V_{DD}$_plp generator (FIG. 2, 208) remains inactive until the uncontrolled power loss event occurs. In this example, a $V_{DD}$ supply voltage is used to power the digital, low voltage control logic until an uncontrolled power loss event occurs. Once instructed by the power loss detection device (FIG. 2, 208), the $V_{DD}$_plp generator (FIG. 2, 208) maintains $V_{DD}$_plp to the low voltage circuits until $V_{PP}$ drops below the threshold.

In the above examples, the $V_{DD}$_plp generator (FIG. 2, 208) obtains and derives the power for $V_{DD}$_plp from the $V_{PP}$ or an associated logic line ($V_{PP}$_logic). In this manner, the high voltage circuits are protected from damage by ensuring that the low voltage circuits are powered and control of the high voltage circuits is maintained for at least as long as the high voltage circuits are powered. In one example, the $V_{DD}$_plp generator (FIG. 2, 208) maintains $V_{DD}$_plp at the same voltage level as $V_{DD}$. The high voltage circuits include resistive devices located within an ink supply in a firing chamber of the printheads (110) that cause ink to be ejected from a number of nozzles fluidly coupled to a firing chamber. In the above examples, the power loss detection device (FIG. 2, 208) may detect a power loss event in $V_{PP}$ either on the printhead die (111) or off the die printhead die. In one example, the power loss detection device (208) may be part of the $V_{DD}$_plp generator (FIG. 2, 208). In another example, the $V_{DD}$_plp generator (FIG. 2, 208) may be located on or off the printhead die (111).

Without the functionality of the present systems and methods, a number of power supplies powering the printheads (110), if not powered down in a correct sequence, may damage a number of circuits within the printheads (110) and their respective printhead dice (111). For example, if the $V_{DD}$ supply voltage used to power the digital, low voltage control logic is lost, but $V_{PP}$ and $V_{PP}$_logic supply voltages used to fire nozzle circuits are still powered, then the printhead (110) may enter an uncontrolled firing mode. In this scenario, the resistive devices would likely burn out and become unusable, rendering the printhead defective, and leaving defects in any subsequent prints. Other circuit failures may also render the printhead (110) unusable. The functionality of the power loss protection circuit (112) will be described in more detail below.

The printing device (100) further includes a number of modules used in the implementation of the systems and methods described herein and in printing documents. The various modules within the printing device (100) include executable program code that may be executed separately. In this example, the various modules may be stored as separate computer program products. In another example, the various modules within the printing device (100) may be combined within a number of computer program products; each computer program product including a number of the modules. The printing device (100) may include a power loss protection module (113) to, when executed by the processor (101), generate and maintain $V_{DD}$_plp flow to the low voltage circuits when an uncontrolled power loss event occurs as described herein.

The printing device (100) further includes a power source (114) to power the printing device (100) and its various hardware components including the power loss protection circuit (112). As will be described in more detail below, the power source (114) may be divided into a number of types of power sources that are used by the power loss protection circuit (112).

FIG. 2 is a diagram of an on-die $V_{DD}$_plp generator (203) of the power loss protection circuit (112) of FIGS. 1A and 1B, according to one example of the principles described herein. The power loss protection circuit (112) may include a number of sub-circuits including a number of input/output (I/O) circuits (201), a reset signal receiver (202), a $V_{DD}$_plp generator (203), a reset buffer tree (204), a number of low voltage circuits (205), a final stage fire control generation circuit (206), a number of high voltage circuits (207), and a power loss detection device (208).

The I/O circuits (201) provide power to the power loss protection circuit (112) from a number of power sources. The printing device (FIGS. 1A and 1B, 100) may receive electrical power from a main power source and provide the electrical power to the I/O circuits (201) and the remainder of the power loss protection circuit (112) to electrically drive the power loss protection circuit (112). As depicted in FIG. 2, a high voltage power supply ($V_{PP}$) (209), a high voltage logic power supply ($V_{PP}$_logic) (210), and a low power voltage supply ($V_{DD}$) (211) may be provided to the I/O circuits (201). $V_{PP}$ (209) is used to power a number of high voltage circuits (207) including the firing resistors located within a firing chamber of the printheads (110), power supply pads, signal pads, signal receivers, and other circuits within a printhead die (111) that use a high voltage power supply. In one example, $V_{PP}$ (209) may provide approximately 30V, positive or negative.

$V_{PP}$_logic (210) is a second high voltage supply used to switch a number of field-effect transistors (FETs) that connect $V_{PP}$ (209) to the firing resistors. In one example, $V_{PP}$_logic (210) may provide approximately the voltage provided by $V_{PP}$ (209) minus 2V. In another example $V_{PP}$_logic (210) may provide approximately 28V, positive or negative. Thus, in one example, $V_{PP}$_logic (210) may be set to a slightly different voltage than $V_{PP}$ (209). This allows the power loss protection circuit (112) to account for system parasitics and provides energy regulation to the nozzles so that the same amount of energy is dispersed in a thermal ink jet firing event.

$V_{DD}$ (211) is used to power a number of low voltage circuits (205) including digital control logic and analog functions used to transmit nozzle fire control signals to the high voltage circuits (207) that control the function of the high voltage circuits (207). In one example, $V_{DD}$ (211) may provide approximately 5V, positive or negative.

Thus, a printhead, controlled by the power loss protection circuit (112), has multiple supplies powering it and its various hardware components. However, if $V_{PP}$ (209) and $V_{DD}$ (211) are not powered down in a correct sequence, elements within the high voltage circuits (207) may be damaged. For example, if $V_{DD}$ (211) is lost, but $V_{PP}$ (209) and $V_{PP}$_logic (210) are still powered, then the printhead may enter an uncontrolled firing mode. In this situation, the firing resistors may burn out and become unusable, leaving a defect in any subsequent prints. Other circuit failures may render the printhead unusable.

Continuing with the description of FIG. 2, the I/O circuits (201) further provide communication between a processor (FIG. 1A, 101) of the printing device (FIGS. 1A and 1B, 100) and the loss protection circuit (112) as well as other networked computing devices. For example, data signals (212) in the form of nozzle firing instructions based on a print job sent to the printing device (FIGS. 1A and 1B, 100) are received by the I/O circuits (201). The data signals (212) may be used by the low voltage circuits (205) and high voltage circuits (207) to fire a number of nozzles within a number of printheads (FIGS. 1A and 1B, 110) of the printing device (FIGS. 1A and 1B, 100).

The I/O circuits (201) further include a reset receiver (202) to receive and provide a number of reset signals (213) to various elements of the power loss protection circuit (112). The reset signals (213) cause the all nozzle firing activity within the power loss protection circuit (112) to cease. However, even with the reset signal (201) active, if $V_{DD}$ (211) is low enough, it cannot be guaranteed that all circuits will remain in a reset state while $V_{PP}$ (209) is still high.

The reset buffer tree circuitry (204) receives the reset signals (213) from the reset receiver (202) as indicated by arrow 223, and sends the reset signals (223) to the low voltage circuits (205) and the final stage control generation circuit (206) as indicated by arrows 233 and 243 to reset the firing controls produced by these circuits. The digital circuits including flip-flops, registers, counters, and other digital circuits within the low voltage circuits (205) and the final stage control generation circuit (206) may receive the reset signal that sets these circuits to a pre-determined state. In one example, the predetermined state is a state in which the low voltage circuits (205) and the final stage control generation circuit (206) are sending instructions for a non-firing state.

The reset signals (213) may be applied after powering on the printing device, before beginning execution of a print job, during a controlled power down sequence within the printing device (FIGS. 1A and 1B, 100), during an uncontrolled power down sequence within the printing device (FIGS. 1A and 1B, 100), other circumstances, or combinations thereof. The reset buffer tree (204) resets a pair of flip-flops within the reset buffer tree (204). Resetting these flip-flops drives the reset signal (213) through the reset buffer tree to the rest of the flip-flops so that a number of circuits such as the low voltage circuits (205) and the final stage control generation circuit (206) each receive the reset signal (213).

The power loss protection circuit (112) may further include low voltage circuits (205). The low voltage circuits (205) may receive the data signals (212) from the I/O circuits (201) as indicated by arrow 222, and convert the data signals (222) into nozzle fire control instructions that control the firing of the nozzles within the high voltage circuits (207) as described herein. The low voltage circuits (205) may further receive $V_{DD}$ (211) from the I/O circuits (201) as indicated by arrow 221. The low voltage circuits (205) use $V_{DD}$ (211) as a power source for operation of the low voltage circuits (205).

The power loss protection circuit (112) may further include the final stage fire control generation circuit (206). The final stage fire control generation circuit (206) generates fire control signals (232) sent to the high voltage circuits (207) to control the high voltage circuits (207) as described herein.

The power loss protection circuit (112) may further include the high voltage circuits (207) described above. The high voltage circuits (207) receive a number of the fire control signals (232), and use the signals to eject ink droplets from the nozzles of the printheads (FIGS. 1A and 1B, 110) according to the data signals (222) received and processed by the low voltage circuits (205). Further, power is supplied to the high voltage circuits (207) from the high voltage power supply ($V_{PP}$) (209) as indicated by arrow 219. $V_{PP}$ (219) represents both $V_{PP}$ (209) and the high voltage logic power supply ($V_{PP}$_logic) (210). In one example, $V_{PP}$ (209) and $V_{PP}$_logic (210) are transferred over the same electrical transmission line. In another example, $V_{PP}$ (209) and $V_{PP}$_logic (210) are transferred over different but associated electrical transmission lines. In still another example, $V_{PP}$ (209) and $V_{PP}$_logic (210) are transferred over different, unassociated electrical transmission lines.

The power loss protection circuit (112) further includes a $V_{DD}$_plp generator (203). As described herein, the $V_{DD}$_plp generator (203) generates a $V_{DD}$ power loss protection supply voltage ($V_{DD}$_plp) (214, 224, 234). In one example, the $V_{DD}$_plp generator (208) maintains $V_{DD}$_plp (214, 224, 234) at the same voltage level as $V_{DD}$ (211, 221). This ensures that circuits that drive the operation of the high voltage circuits (207) remain powered during an uncontrolled power loss event long enough to allow $V_{PP}$ to bleed down below a safe, threshold voltage level.

The $V_{DD}$_plp generator (203) is connected to the $V_{PP}$ (219) line. In one example, the $V_{DD}$_plp generator (203) is connected to $V_{PP}$ (209) via the $V_{PP}$ (219) line, as opposed to $V_{PP}$_logic (210). In another example, the $V_{DD}$_plp generator (203) is connected to $V_{PP}$_logic (210) via the $V_{PP}$ (219) line, as opposed to $V_{PP}$ (209). In either example, the $V_{DD}$_plp generator (203) obtains electrical power from the $V_{PP}$ (219) line, and produces the power loss protection supply voltage ($V_{DD}$_plp) as described herein. The $V_{DD}$_plp supply voltage (214, 224, 234) is provided to a number of circuits within the power loss protection circuit (112) to maintain control of the high voltage circuits (207).

In one example, $V_{DD}$_plp (214, 224, 234) is provided to all circuits used in controlling the high voltage circuits (207). In this example, the circuits used in controlling the high voltage circuits (207) include the reset signal receiver (202), the reset buffer tree (204), the low voltage circuits (205), and the final stage fire control generation circuit (206), among other circuits. In this manner, the power loss protection circuit (112) provides a power loss protection to all non-high voltage circuits. Although providing $V_{DD}$_plp (214, 224, 234) to all circuits used in controlling the high voltage circuits (207) ensures that the power loss protection circuit (112) continues to function as if no uncontrolled power loss event occurred, doing so may add to the cost of manufacturing the power loss protection circuit (112).

In another example, $V_{DD}$_plp (214, 224, 234) is provided to an exclusive number of circuits used in controlling the high voltage circuits (207). In this example, the circuits used in controlling the high voltage circuits (207) include the reset signal receiver (202), the reset buffer tree (204), and the final stage fire control generation circuit (206). In this manner, the only circuits chosen to be powered by $V_{DD}$_plp (214, 224, 234) are those circuits that draw little current, and are sufficient to ensure safe power down. This example excludes analog circuits which draw DC current including, for example, nozzle data memory upstream of the final stage fire control generation circuit (206). This also excludes high-frequency digital switching circuits such as those found in the low voltage circuits (205).

This example of exclusive powering of the reset signal receiver (202), the reset buffer tree (204), and the final stage fire control generation circuit (206) is depicted using the shading of the various circuits and the shading keys (250, 251, 252, 253). Using the shading keys (250, 251, 252, 253), FIG. 2 indicates that the high voltage circuits (207) are powered by $V_{PP}$ (209, 219).

Shading key (251) indicates that the low voltage circuits (205) are powered by $V_{DD}$ (221). Thus, in the example described above where $V_{DD}$_plp (214, 224, 234) is provided to an exclusive number of circuits, the low voltage circuits (205) are not powered by $V_{DD}$_plp (214, 224, 234). However, in the example described herein where the $V_{DD}$_plp generator (203) generates $V_{DD}$_plp (214, 224, 234) to all circuits used in controlling the high voltage circuits (207) including low voltage circuits (205), the shading of the low voltage circuits (205) block may include the shading of shading key (253).

Shading key (252) indicates that the I/O circuits (201) and the $V_{DD}$_plp generator (203) are powered by the low power voltage supply ($V_{DD}$) (211) or $V_{PP}$ (209, 219) as obtained directly or indirectly from the power source (FIG. 1B, 114). The I/O circuits (201) would be unpowered if an uncontrolled power loss event was to take place in the printing device (FIGS. 1A and 1B, 100). In this situation, the $V_{DD}$_plp generator (203) powers the reset receiver (202) of the I/O circuits (201), but the remainder of the I/O circuits (201) are rendered inoperable. Shading key (253) indicates that the reset receiver (202), the reset buffer tree circuitry (204) and the final stage fire control generation circuit (206) are powered by $V_{DD}$_plp (214, 224, 234) generated by the $V_{DD}$_plp generator (203).

In continuing with the example of exclusive powering of the reset signal receiver (202), the reset buffer tree (204), and the final stage fire control generation circuit (206), excluding a number of circuits from receiving $V_{DD}$_plp (214, 224, 234) has several advantages. One advantage is that if $V_{DD}$_plp (214, 224, 234) is generated on the printhead die (111), the $V_{DD}$_plp generator (203) may be physically smaller. Area available on the printhead die (111) of a printhead (110) may be a significant driver of the manufacturing costs of the printhead. Another advantage of excluding a number of circuits from receiving $V_{DD}$_plp (214, 224, 234) is that if $V_{DD}$_plp (214, 224, 234) is generated and maintained off-die, it may be more cost-effective to also implement the exclusive circuits which maintain voltage on $V_{DD}$_plp (214, 224, 234) off the printhead die (111) if there is a small load on $V_{DD}$_plp (214, 224, 234).

The power loss protection circuit (112) further includes a power loss detection device (208). The power loss detection device (208) detects a loss of power to the printing device (FIGS. 1A and 1B, 100), a number of circuits within the power loss protection circuit (112), or combinations thereof. If the power loss detection device (208) detects a loss of power, the power loss detection device (208) sends instructions to the $V_{DD}$_plp generator (203) as indicated by arrow 235. The instructions instruct the $V_{DD}$_plp generator (203) to generate $V_{DD}$_plp for a number of the circuits within the power loss protection circuit (112) as described herein.

In an example where $V_{DD}$_plp generator (203) does not continuously provide $V_{DD}$_plp to a number of low voltage circuits, but, instead, is active when an uncontrolled power loss event occurs, the $V_{DD}$_plp generator (203) receives the instruction from the power loss detection device (208), and begins to provide $V_{DD}$_plp to a number of low voltage circuits as described herein. In this example, the $V_{DD}$_plp generator (203) remains inactive until an uncontrolled power loss event occurs. In an example where the $V_{DD}$_plp generator (203) continuously provides $V_{DD}$_plp to a number of low voltage circuits irrespective of whether an uncontrolled power loss event has occurred, the power loss detection device (208) may be optional within the power loss protection circuit (112).

In FIG. 2, the power loss detection device (208) is depicted as being coupled to the $V_{PP}$ (219) line such that the power loss detection device (208) may detect power loss to the $V_{PP}$ (219) line. However, the power loss detection device (208) may be coupled to any number of circuits within the power loss protection circuit (112). Further, in FIG. 2, the power loss detection device (208) is depicted as being located on the printhead die (111). However, in another example, the power loss detection device (208) may be located off die. In this off-die example, the power loss detection device (208) may send instructions to the $V_{DD}$_plp generator (203) via the I/O circuits (201).

Figure 3:
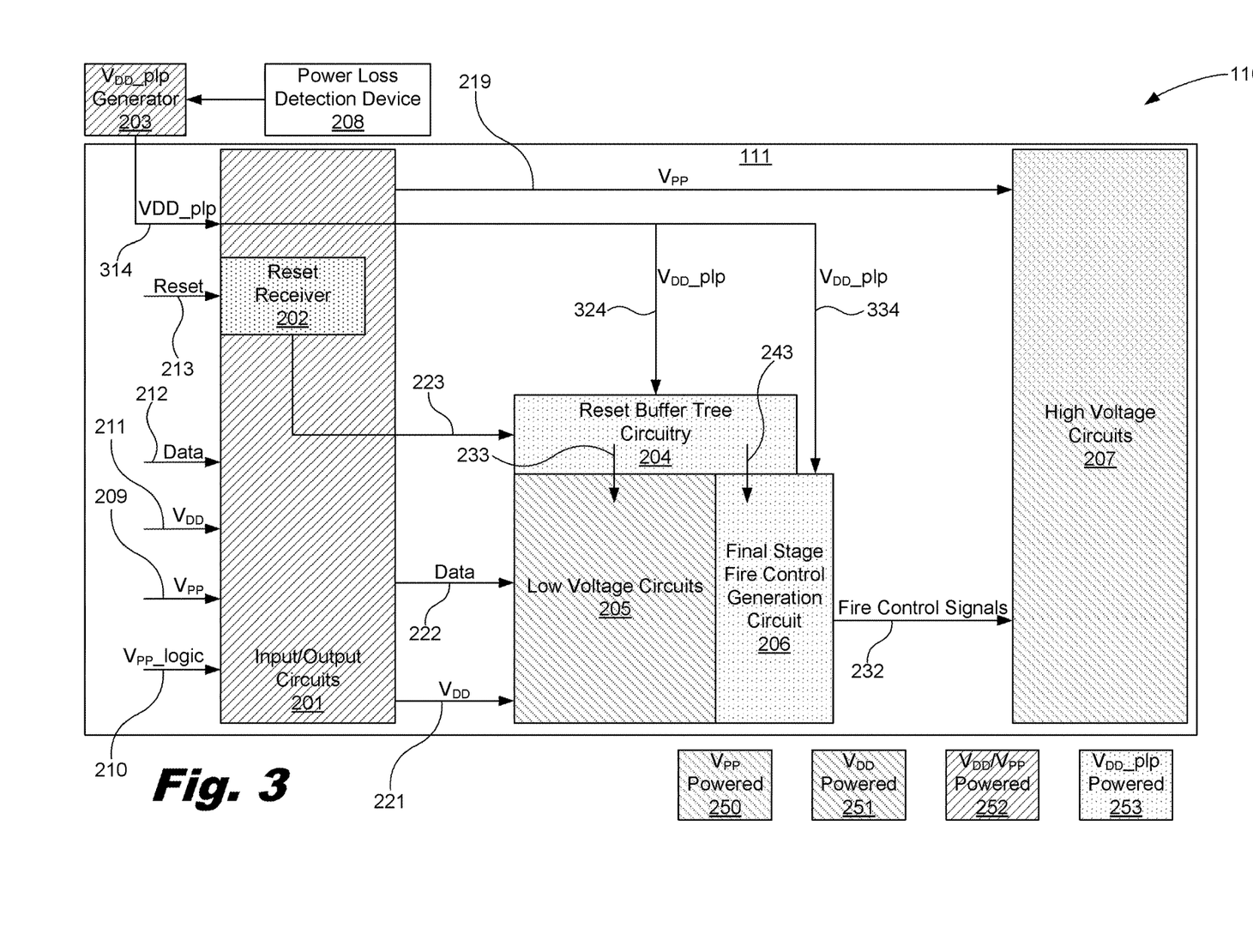
FIG. 3 is a diagram of an off-die $V_{DD}$_plp generator of the power loss protection circuit of FIGS. 1A and 1B, according to one example of the principles described herein.

FIG. 3 is a diagram of an off-die $V_{DD}$_plp generator (208) of the power loss protection circuit (112) of FIGS. 1A and 1B, according to one example of the principles described herein. Similar descriptions and element numbering presented above in connection with FIG. 2 are applicable to FIG. 3 and its associated description herein. In FIG. 3, the $V_{DD}$_plp generator (208) is located at an off-die location. The printhead die (111) may include limited area for the inclusion of additional circuits or other hardware. Inclusion of the $V_{DD}$_plp generator (208) on the printhead die (111) may increase the cost of manufacturing the printhead die, and may result in a relatively more expensive printhead (110). Therefore, in the example of FIG. 3, the $V_{DD}$_plp generator (208) is located at off the printhead die (111).

In the example of FIG. 3, the $V_{DD}$_plp generator (208) derives power from the high voltage power supply ($V_{PP}$) (209) or high voltage logic power supply ($V_{PP}$_logic) (210) as described above, but does so at an off-die location. In this manner, the $V_{DD}$_plp generator (208) may obtain sufficient power to generate the $V_{DD}$ power loss protection supply voltage ($V_{DD}$_plp) (314, 324, 334), and provide $V_{DD}$_plp (314, 324, 334) to a number of circuits in the power loss protection circuit (112) located on the printhead die (111).

The power loss protection circuit (112) of FIG. 3 may further include the power loss detection device (208) described in connection with FIG. 2 above. In the example of FIG. 3, the power loss detection device (208) is located off the printhead die (111) along with the $V_{DD}$_plp generator (208). In this manner, the power loss detection device (208) may detect a power loss within the printing device (FIGS. 1A and 1B, 100) from any circuit within the printing device (FIGS. 1A and 1B, 100) such as, for example, the power loss protection circuit (112), the power source (FIG. 1B, 114), or other device or circuit that may be effected by a power loss event upstream from the power loss protection circuit (112).

Figure 5:
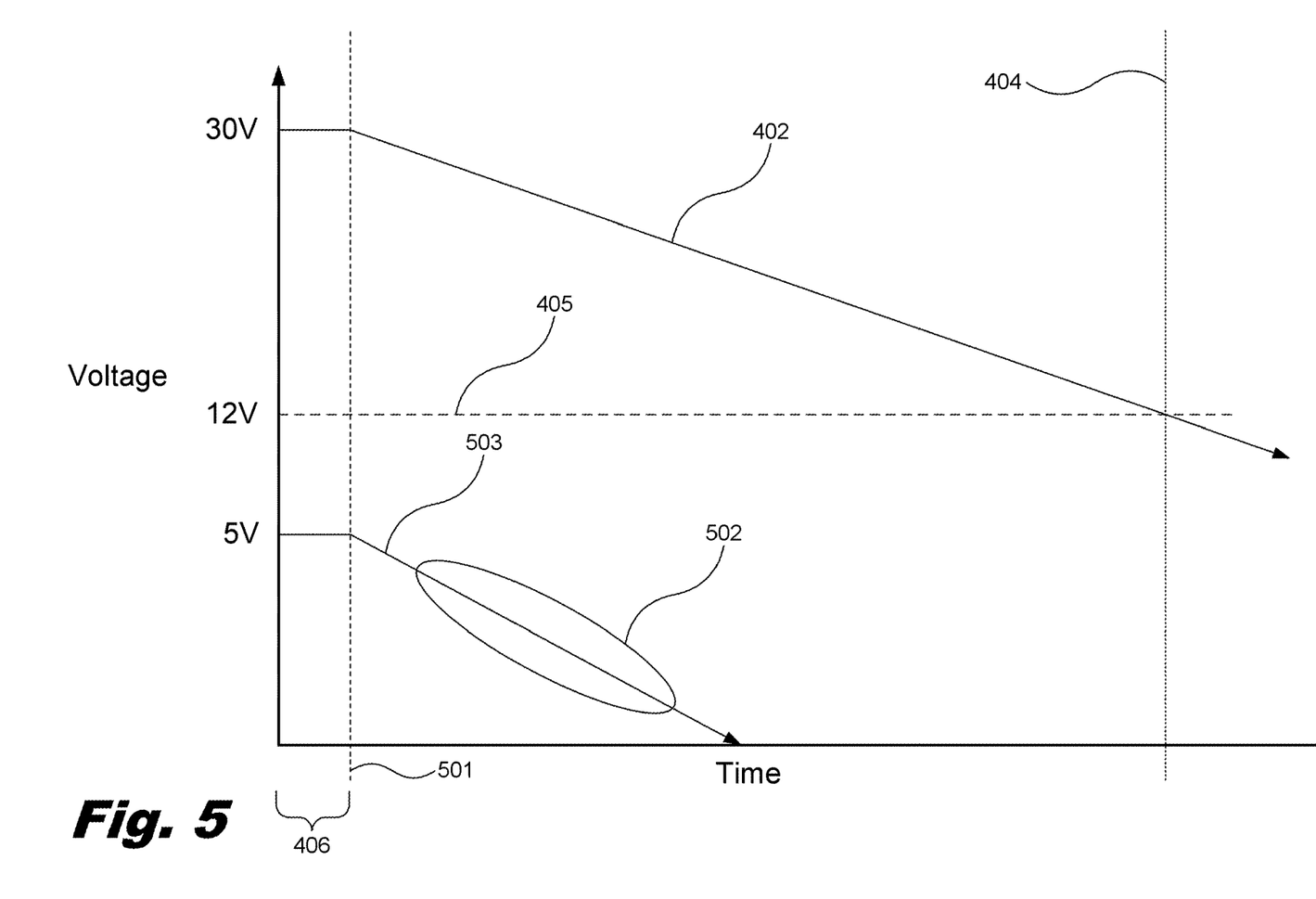
FIG. 5 is a graph depicting an uncontrolled power down sequence of a printing device without the power loss protection circuits of FIGS. 2 and 3, according to one example of the principles described herein.
Figure 6:
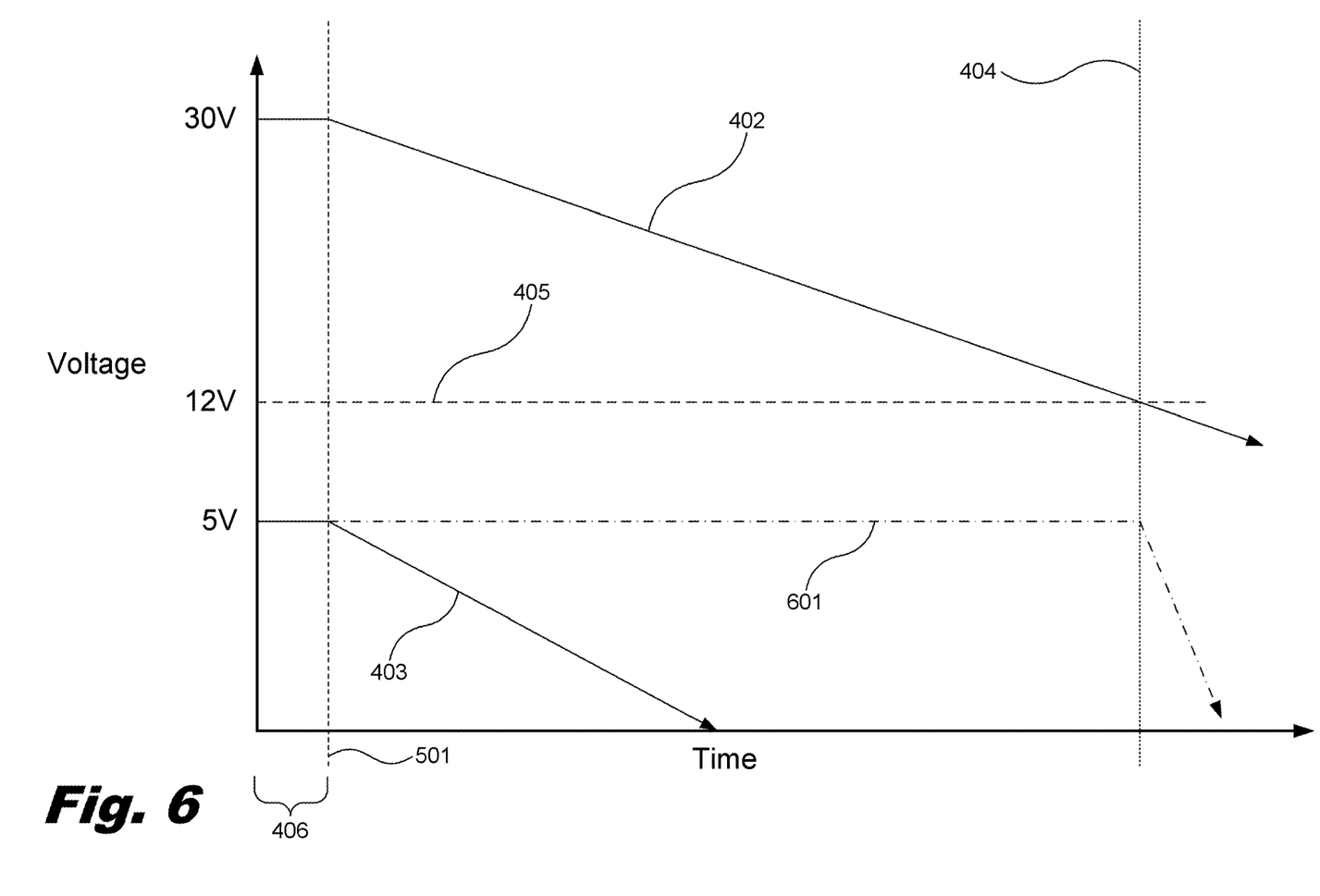
FIG. 6 is a graph depicting an uncontrolled power down sequence of a printing device with the power loss protection circuits of FIGS. 2 and 3, according to one example of the principles described herein.

The possibilities associated with controlled or uncontrolled loss of power to the printing device (FIGS. 1A and 1B, 100) and its power loss protection circuit (112) will now be described in connection with FIGS. 4 through 6. The numbers, values, units, curves, lines, or other aspects of FIGS. 4 through 6 are only examples to be used in describing the processes associated with controlled or uncontrolled loss of power.

Figure 4:
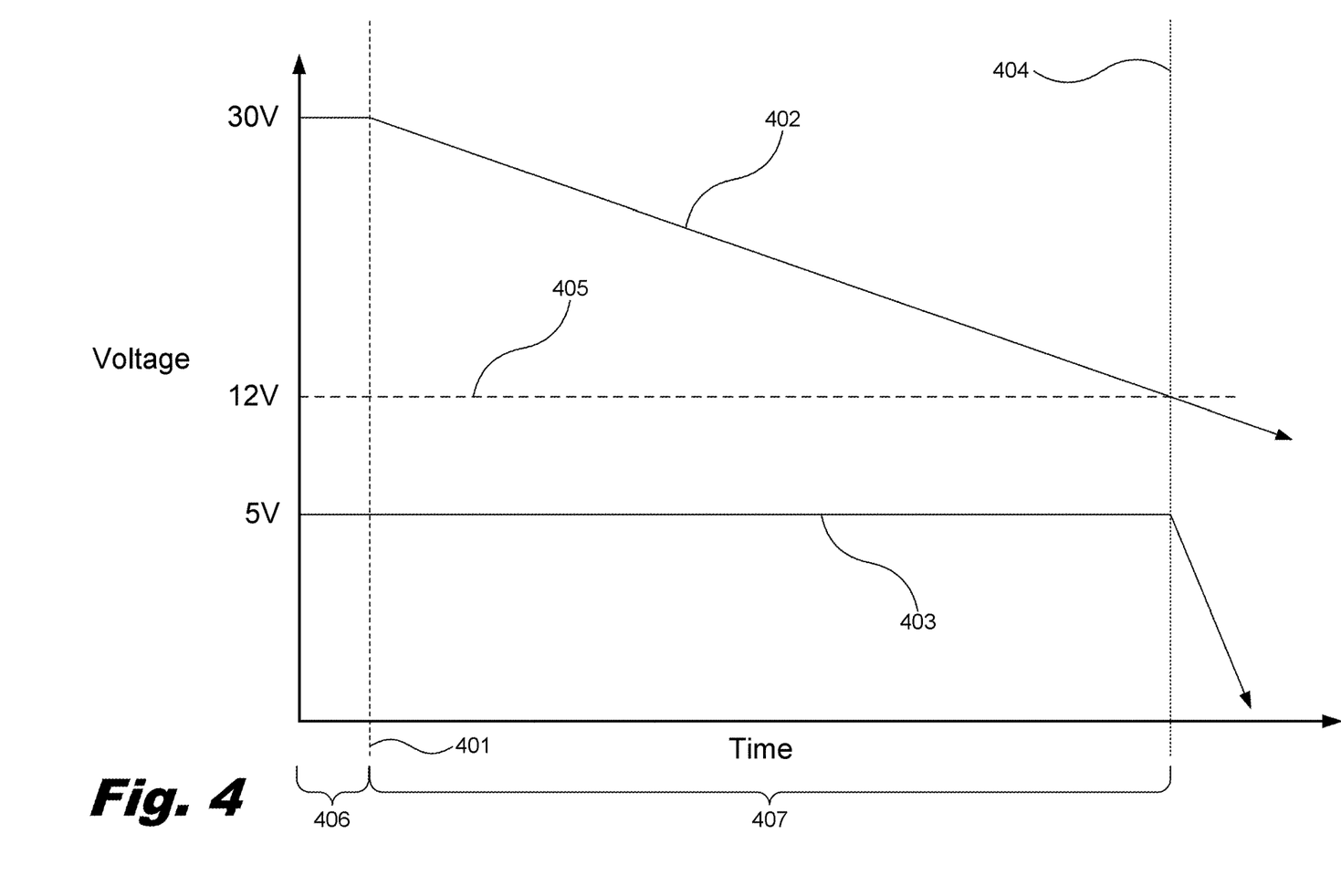
FIG. 4 is a graph depicting a printer controlled power down sequence, according to one example of the principles described herein.

FIG. 4 is a graph depicting a printer-controlled power down sequence, according to one example of the principles described herein. Printing devices (FIGS. 1A and 1B, 100) are designed to power down the printheads (FIGS. 1A and 1B, 110) and their respective high voltage circuits (207) in a controlled and safe manor. This controlled power down uses a protocol to power down circuits within the printing device (FIGS. 1A and 1B, 100) including the input/output (I/O) circuits (201), reset signal receiver (202), reset buffer tree (204), low voltage circuits (205), final stage fire control generation circuit (206), and high voltage circuits (207), in a sequence that will not damage the circuits. A controlled power down may occur when a request is made to do so, such as when a user pushes a power button on the printing device (FIGS. 1A and 1B, 100). This sequence may include powering down the multiple power supplies used on a printhead such as $V_{PP}$ (FIGS. 2 and 3, 209, 219), $V_{PP}$_logic (FIGS. 2 and 3, 210, 219), and $V_{DD}$ (FIGS. 2 and 3, 211, 221) in a particular sequence.

In both examples described in connection with FIGS. 2 and 3, the $V_{DD}$_plp generator's (208) derivation of power from the high voltage power supply ($V_{PP}$) (209) or high voltage logic power supply ($V_{PP}$_logic) (210) ensures that the voltages provided to the reset signal receiver (202), reset buffer tree (204), and final stage fire control generation circuit (206), and, in some examples, the low voltage circuits (205), drop to a safe voltage level after $V_{PP}$ drops to a safe level. Further, the manner in which the power loss protection circuit (112) powers down the low voltage circuits (205) and high voltage circuits (207) is independent of the architecture of the power supplies within the power loss protection circuit (112), and independent of firmware sequencing controls provided by, for example, the processor (FIG. 1B, 101) of the printing device (FIGS. 1A and 1B, 100).

As depicted in FIG. 4, the y-axis represents voltage levels within the power loss protection circuit (112) of the printing device (FIGS. 1A and 1B, 100). The x-axis represents time. In one example, the time taken to power down the printing device (FIGS. 1A and 1B, 100) and its various circuitry may be on the order of microseconds or milliseconds. However, because the present systems and methods ensure that the $V_{DD}$_plp generator (203) provides $V_{DD}$_plp (214, 224, 234) until a sufficient bleed down of $V_{PP}$ (209, 219) as described herein, the x-axis and its indication of time is independent of any required or specified time period.

Initially, the printing device (FIGS. 1A and 1B, 100) is operating at normal voltages as indicated by bracket 406. During this period before the controlled power down sequence begins, $V_{PP}$ (209, 219) may be at, for example, approximately 30 volts, and $V_{DD}$ (211, 221) may be at, for example, 5 volts. These are example voltages, and $V_{PP}$ (209, 219) and $V_{DD}$ (211, 221) may operate at other voltages or voltage ranges depending on voltage requirements of the circuits within the printing device (FIGS. 1A and 1B, 100). In FIGS. 4 through 6, line 402 indicates the voltage level of $V_{PP}$ (209, 219) before and during the controlled power down, and line 403 indicates the voltage level of $V_{DD}$ (211, 221) before and during the controlled power down.

Line 401 indicates the instance when the printing device (FIGS. 1A and 1B, 100) initiates a controlled power down sequence. When the controlled power down sequence begins at 401, $V_{PP}$ (209, 219) begins to bleed down. As the controlled power down sequence occurs, a number of circuit elements such as a number of capacitors within the high voltage circuits (207) start dissipating their stored energy. During the controlled power down, the printing device (100) maintains the voltage level of $V_{DD}$ (211, 221) until $V_{PP}$ (209, 219) drops below a threshold voltage (405). This allows the high voltage circuits (207) to safely bleed down in a controlled manner without damaging circuitry within the high voltage circuits (207).

In one example, the threshold voltage (405) is approximately 12 volts. In this example, the threshold voltage (405) is 12 volts because this is a minimum voltage level at which a number of circuits used to switch $V_{PP}$_logic (210) into a firing event of the nozzles within the printheads (FIGS. 1A and 1B, 110) are operable. However, the threshold voltage (405) required for operation of the circuits used to switch $V_{PP}$_logic (210) may be any voltage level. Once the voltages provided by $V_{PP}$_logic (210) and stored within the high voltage circuits (207) bleeds below the threshold voltage (405), the possibility of damage to the high voltage circuits (207) is mitigated or eliminated.

$V_{DD}$ (211, 221) is maintained at a voltage level sufficient to power a number of circuits used to control the high voltage circuits (207) including the input/output (I/O) circuits (201), reset signal receiver (202), reset buffer tree (204), low voltage circuits (205), final stage fire control generation circuit (206), or combinations thereof. In one example, the voltage level maintained by $V_{DD}$ (211, 221) is 5 volts. However, the voltage level required for operation of the circuits used to control the high voltage circuits (207) may be any voltage level.

The period at which the printing device (100) maintains the voltage level of $V_{DD}$ (211, 221) during a controlled power down sequence is indicated by bracket 406. The period (407) of maintaining $V_{DD}$ (211, 221) at its operating voltage level may end at line 404 where $V_{PP}$ (209, 219) drops below the threshold voltage (405). At 404, $V_{DD}$ (211, 221) may also bleed down as $V_{PP}$ (209, 219) continues to bleed down.

FIG. 5 is a graph depicting an uncontrolled power down sequence of a printing device (FIGS. 1A and 1B, 100) without the power loss protection circuits (112) of FIGS. 2 and 3, according to one example of the principles described herein. As described above in connection with FIG. 4, the printing device (FIGS. 1A and 1B, 100) initially operates at normal voltages as indicated by bracket 406. An uncontrolled power loss event may occur at line 501 with line 503 indicating the voltage level of $V_{DD}$ (211, 221) before and during an uncontrolled power down. In the uncontrolled power down sequence of FIG. 5, $V_{DD}$ (211, 221) immediately starts to bleed down. As depicted in FIG. 5, $V_{DD}$ (211, 221) bleeds down at a faster rate than $V_{PP}$ (209, 219) bleeds down due, in part, to large capacitance within the high voltage circuits (207). Within the area designated by 502, even though the printhead die (FIGS. 2 and 3, 111) may have been reset via the application of the reset signals (FIGS. 2 and 3, 223, 233, 243), the low voltage circuits (205) may be in an unknown state due to a relatively low $V_{DD}$ (211, 221). This may result in the high voltage circuits (207) firing uncontrollably, and may result in damage to or destruction of the resistors and other active devices within the high voltage circuits (207). In order to overcome this potential for damage, the power loss protection circuit (FIGS. 1, 2, and 3, 112) maintains $V_{DD}$ (211, 221) at an active voltage level until after $V_{PP}$ (209, 219) falls below the threshold voltage (405) as will now be described in connection with FIG. 6.

FIG. 6 is a graph depicting an uncontrolled power down sequence of a printing device (FIGS. 1A and 1B, 100) with the power loss protection circuits (112) of FIGS. 2 and 3, according to one example of the principles described herein. As described in connection with FIG. 5, line 503 indicates the voltage level of $V_{DD}$ (211, 221) before and during an uncontrolled power down. In order to maintain $V_{DD}$ (211, 221) at an active voltage level until after $V_{PP}$ (209, 219) falls below the threshold voltage (405), the $V_{DD}$_plp generator (203) generates $V_{DD}$_plp (FIGS. 2 and 3, 214, 224, 234) as indicated by line 601. In this manner, a number of the non-high voltage circuits are maintained at an active voltage level until after $V_{PP}$ (209, 219) falls below the threshold voltage (405) by using the $V_{DD}$_plp generator (203) to generate $V_{DD}$_plp (FIGS. 2 and 3, 214, 224, 234) in place of the original $V_{DD}$ (211, 221). Non-high voltage circuits include the reset signal receiver (202), reset buffer tree (204), and final stage fire control generation circuit (206), and, in some examples, the low voltage circuits (205). Thus, as described in connection with FIG. 6, the $V_{DD}$_plp generator (203) reduces or eliminates the potential for uncontrolled high voltage dissipation within printhead resistive elements and other active devices in a number of high voltage circuits (FIGS. 2 and 3, 207) of the printing device (FIGS. 1A and 1B, 100) that may render the resistors and other active devices inoperable.

Figure 7:
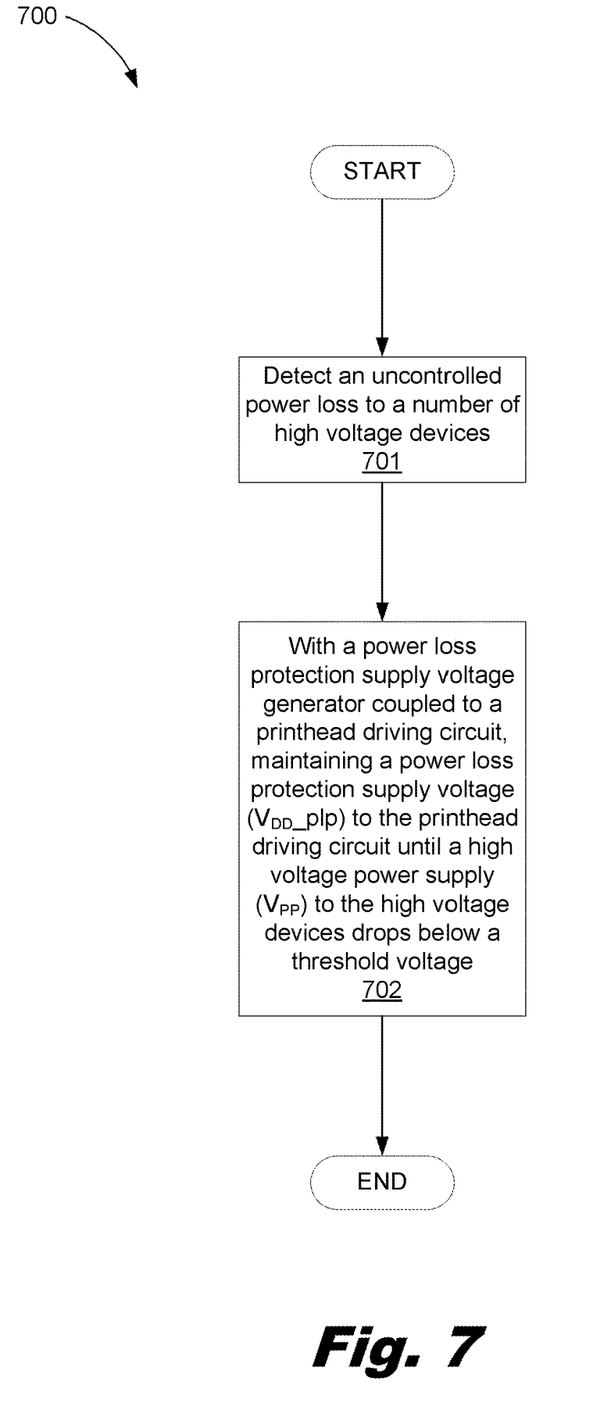
FIG. 7 is a flowchart showing a method of operating a printing device during a power loss event, according to one example of the principles described herein.
Figure 8:
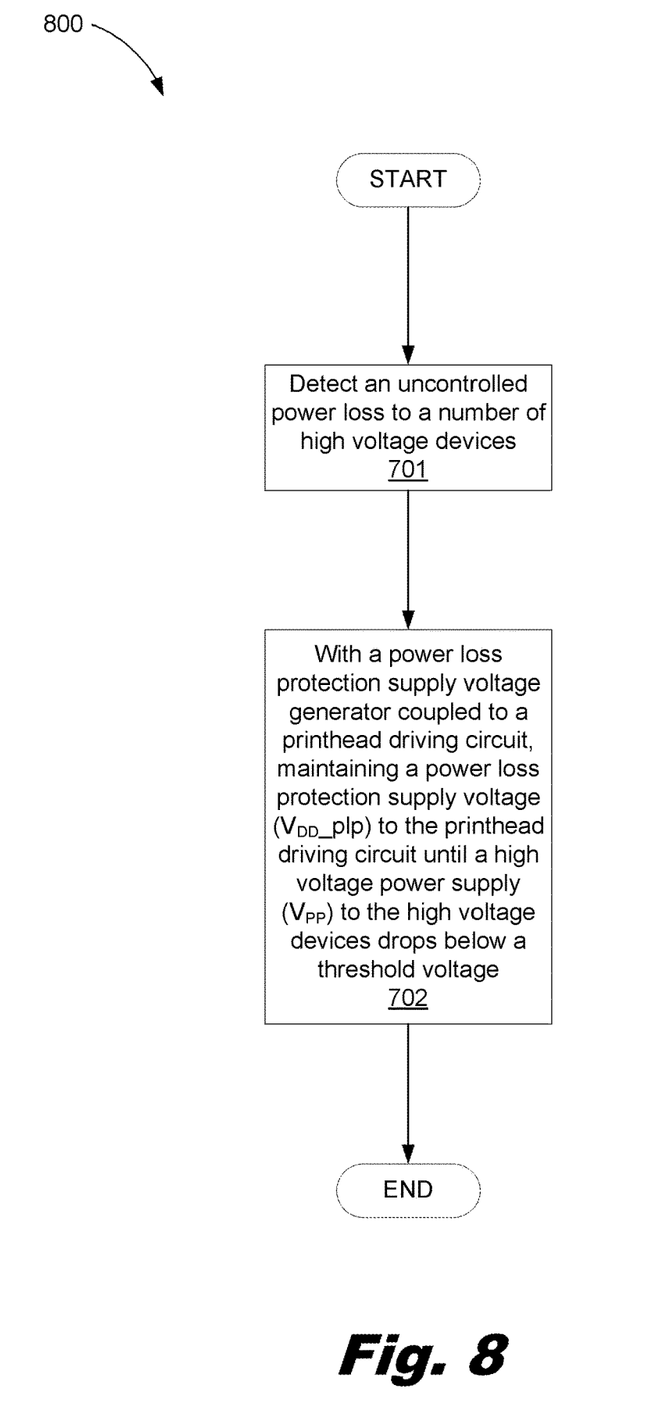

FIG. 7 is a flowchart showing a method (700) of operating a printing device (FIGS. 1A and 1B, 100) during a power loss event, according to one example of the principles described herein. The method (700) of FIG. 7 may begin by detecting (block 701) an uncontrolled power loss event to a number of high voltage devices (FIGS. 2 and 3, 207). Detection (block (701) of the power loss event may be performed by the power loss detection device (FIGS. 2 and 3, 208).

The method (700) may further include, with a power loss protection supply voltage ($V_{DD}$_plp) generator (FIGS. 2 and 3, 203) coupled to a printhead driving circuit (FIGS. 2 and 3, 205), maintaining a power loss protection supply voltage ($V_{DD}$_plp) (FIGS. 2 and 3, 214, 224, 234) to the printhead driving circuit (FIGS. 2 and 3, 205) until a high voltage power supply ($V_{PP}$) (209, 219) to the high voltage devices (FIGS. 2 and 3, 207) drops below a threshold voltage (FIGS. 4, 5, and 6, 405). In this manner, the high voltage devices (FIGS. 2 and 3, 207) are protected from damage to or destruction of the resistors and other active devices within the high voltage devices (FIGS. 2 and 3, 207). This type of damage may occur if the high voltage devices (FIGS. 2 and 3, 207) were allowed to fire without being controlled by the low voltage circuits (FIGS. 2 and 3, 205) and other circuitry used to control the firing of the high voltage devices (FIGS. 2 and 3, 207).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the printing device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods for operating a printing device during a power loss event. The method may include detecting an uncontrolled power loss to a number of high voltage devices. The method may further include, with a power loss protection supply voltage generator coupled to a printhead driving circuit, maintaining a power loss protection supply voltage ($V_{DD}$_plp) to the printhead driving circuit until a high voltage power supply ($V_{PP}$) to the high voltage devices drops below a threshold voltage. A circuit topology for a printing device may include a number of high voltage devices to power firing of a number of nozzles within a printhead die, and a high voltage power supply connected to the high voltage devices. The circuit topology may further include fire control circuitry connected to the high voltage devices to control the firing of the nozzles. The fire control circuitry may include a final stage fire control signal generation device. The circuit topology may further include a low voltage power supply connected to the fire control logic to supply power to the fire control circuitry, and a power loss protection supply voltage generator to provide a power loss protection supply voltage ($V_{DD}$_plp) from the high voltage power supply to the final stage fire control signal generation device. The power loss protection supply voltage ($V_{DD}$_plp) may be supplied for a long enough duration after an uncontrolled power loss to the printing device to allow the high voltage power supply to fall below a threshold voltage.

This operation of the printing device during a power loss event may have a number of advantages, including: (1) protecting resistors and other circuits within the high voltage circuits from damage resulting from power loss events; (2) reduces the cost of manufacturing the printing device by not requiring extra system-level components and by enabling possible cost reduction of existing power-down circuits; and (3) provides for fully integrated power loss protection circuitry on the printhead die using minimal die area, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A circuit comprising:
   high voltage devices to power firing of nozzles within a printhead die;
   a high voltage power supply connected to the high voltage devices;
   fire control circuitry connected to the high voltage devices to control the firing of the nozzles;
   reset circuitry;
   a low voltage power supply to supply power to the fire control circuitry and the reset circuitry;
   a power loss detection device having an input connected to a high voltage output by the high voltage power supply, the power loss detection device to detect an uncontrolled power loss of the high voltage during a power loss event including a loss of both the high voltage power supply and the low voltage power supply; and
   a power loss protection supply voltage generator to provide a protection supply voltage derived from the high voltage to the fire control circuitry and the reset circuitry for a time duration responsive to a detection of the uncontrolled power loss to allow the high voltage to fall below a threshold voltage, wherein the reset circuitry when powered by the protection supply voltage is to send a reset signal to the fire control circuitry to reset a flip-flop in the fire control circuitry during the power loss event, wherein the power loss protection supply voltage generator is inactive and does not provide the protection supply voltage prior to the uncontrolled power loss.

2. The circuit of claim 1, wherein in response to the power loss detection device detecting the uncontrolled power loss, the power loss detection device is to send an instruction to the power loss protection supply voltage generator to provide the protection supply voltage.

3. The circuit of claim 1, wherein the high voltage power supply is a high voltage logic supply.

4. The circuit of claim 1, wherein the power loss protection supply voltage generator is located on the printhead die.

5. The circuit of claim 1, wherein the power loss protection supply voltage generator is located off the printhead die, the power loss protection supply voltage generator to send the protection supply voltage to the fire control circuitry from an off die location.

6. A printing device comprising:
   a number of printheads, each printhead comprising:
      ink firing elements; and
      high voltage circuits to drive the ink firing elements;
   a high voltage power supply to power the ink firing elements;
   low voltage circuits to provide fire control signals to the high voltage circuits;
   a final stage fire control signal generation device connected to the low voltage circuits;
   reset circuitry;
   a low voltage power supply to provide power to the low voltage circuits and the reset circuitry;
   a power loss detection device having an input connected to a high voltage output by the high voltage power supply, the power loss detection device to detect an uncontrolled power loss of the high voltage during a power loss event including a loss of both the high voltage power supply and the low voltage power supply; and
   a power loss protection circuit, comprising:
      a power loss protection supply voltage generator to maintain a power loss protection supply voltage to power the final stage fire control signal generation device and the reset circuitry responsive to the uncontrolled power loss until the high voltage drops below a threshold voltage, the power loss protection supply voltage being based on the high voltage, wherein the reset circuitry when powered by the power loss protection supply voltage is to send a reset signal to fire control circuitry comprising the final stage fire control signal generation device during the power loss event, the reset signal to reset a flip-flop in the fire control circuitry, wherein the power loss protection supply voltage generator is inactive and does not provide the power loss protection supply voltage prior to the uncontrolled power loss, and the power loss protection supply voltage generator is active to provide the power loss protection supply voltage responsive to a detection of the uncontrolled power loss of the high voltage by the power loss detection device.

7. The printing device of claim 6, wherein the high voltage power supply is a dedicated high voltage power supply, a high voltage logic supply, or a combination thereof.

8. The printing device of claim 6, wherein the reset circuitry is to reset the low voltage circuits and the final stage fire control signal generation device.

9. The printing device of claim 6, wherein the power loss protection supply voltage generator is incorporated into a printhead die of a printhead of the printheads.

10. The printing device of claim 6, wherein the power loss protection supply voltage generator is located off a printhead die of the printheads.

11. A method of operating a printing device during a power loss event, comprising:
    detecting, by a power loss detection device, an uncontrolled power loss of a high voltage to high voltage devices, the high voltage produced by a high voltage power supply, and the power loss detection device having an input connected to the high voltage, wherein the uncontrolled power loss occurs during the power loss event including a loss of both the high voltage power supply and a low voltage power supply;
    activating reset circuitry to reset a printhead driving circuit if the power loss detection device detects the uncontrolled power loss, wherein the reset circuitry is powered by the low voltage power supply prior to the power loss event; and
    with a power loss protection supply voltage generator coupled to the printhead driving circuit, generating a power loss protection supply voltage to power the printhead driving circuit and the reset circuitry responsive to the uncontrolled power loss until the high voltage to the high voltage devices drops below a threshold voltage, wherein the reset circuitry when powered by the power loss protection supply voltage sends a reset signal to the printhead driving circuit during the power loss event, the reset signal resetting a flip-flop in the printhead driving circuit, wherein the power loss protection supply voltage generator is inactive and does not provide the power loss protection supply voltage prior to the uncontrolled power loss, and the power loss protection supply voltage generator is active to provide the power loss protection supply voltage responsive to a detection of the uncontrolled power loss of the high voltage by the power loss detection device.

12. The method of claim 11, comprising maintaining, by the power loss protection supply voltage generator, the power loss protection supply voltage at the same voltage as a low supply voltage provided by the low voltage power supply prior to the power loss event.

13. The method of claim 11, wherein the power loss protection supply voltage generator is powered by the high voltage power supply.

14. The circuit of claim 1, wherein the resetting of the flip-flop in the fire control circuitry is to cause ceasing of nozzle firing activity of the nozzles.

* * * * *